United States Patent [19]

Norcross

[11] 4,195,812

[45] Apr. 1, 1980

[54] COUPLER FOR GREASE GUNS

[75] Inventor: Paul Norcross, Des Plaines, Ill.

[73] Assignee: Thexton Manufacturing Company, Minneapolis, Minn.

[21] Appl. No.: 864,253

[22] Filed: Dec. 27, 1977

[51] Int. Cl.² .......................................... F16L 37/28
[52] U.S. Cl. ................................ 251/148; 251/149.5; 184/105 C; 285/307; 285/322
[58] Field of Search ............... 251/149.4, 149.5, 149.8, 251/148; 137/614; 141/383, 384, 385, 386; 184/105 R, 105 A, 105 B, 105 C; 285/307, 308, 309, 322

[56] References Cited

U.S. PATENT DOCUMENTS

| | | | |
|---|---|---|---|
| 1,796,827 | 3/1931 | Butler | 184/105 B |
| 1,799,279 | 4/1931 | Butler | 251/149.8 X |
| 2,311,097 | 2/1943 | Sundholm | 184/105 R |
| 2,362,880 | 11/1944 | Campbell | 184/105 R |
| 2,397,342 | 3/1946 | Farrell | 184/105 R |
| 2,400,817 | 5/1946 | Fox et al. | 184/105 B |
| 2,764,769 | 10/1956 | Neuman | 184/105 C |
| 3,180,533 | 4/1965 | Sundholm | 184/105 B X |
| 4,063,708 | 12/1977 | Smith | 251/149.4 |

Primary Examiner—William R. Cline
Attorney, Agent, or Firm—H. Dale Palmatier

[57] ABSTRACT

A grease gun coupler for attachment to a Zerk fitting, the coupler having a rotatable socket to constrict the jaws onto the Zerk fitting; there being a non-yielding multi-part mechanical connection between the rear edges of the clamping jaws and the front end of the tubular base of the coupler, including a rigid sleeve bearing rearwardly against the tubular base of the coupler and having rigid legs projecting through the base wall of a cup-shaped seal and bearing against the annular disc which engages the jaws.

10 Claims, 10 Drawing Figures

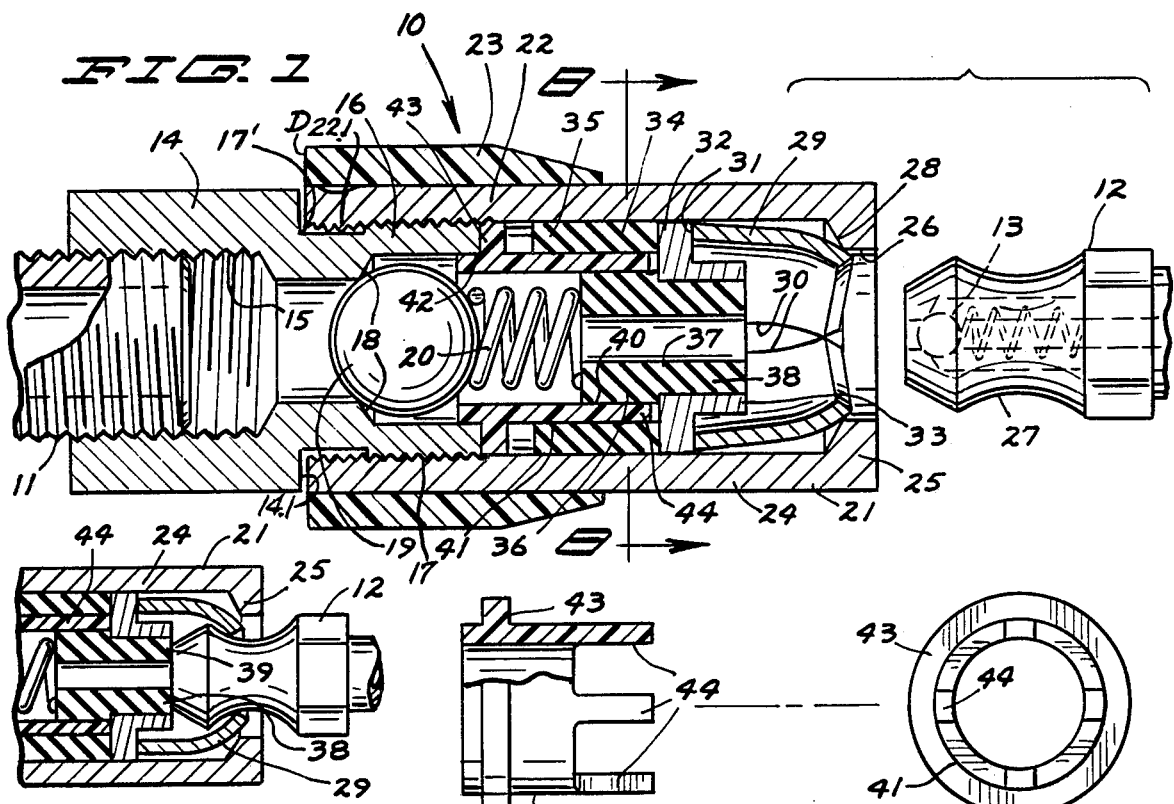

COUPLER FOR GREASE GUNS

This invention relates to a lock-on coupling for connecting a grease gun or similar source of grease under pressure to a Zerk fitting or grease-receiving fitting on the apparatus or bearing to be lubricated.

BACKGROUND OF THE INVENTION

Various couplers have existed for attaching Zerk fittings to a pressure source of grease. Mostly, such couplers accept the fitting with a snap action and then tighten the grip of the clamping jaws in the coupling onto the fitting as the grease pressure in the coupler is increased. Typical of such couplers are those disclosed in U.S. Pat. Nos. 2,311,097 and 2,362,880, and 3,180,533. Experience has shown, however, that such couplers will often inadvertently release from the fitting and pop off if the fitting is twisted or cocked during use, with the result that grease under pressure will be squirted out and wasted.

Often a coupling must be applied to a fitting in such a position that it cannot easily be held onto the fitting, or if it is held manually, the workman may not have the facility to simultaneously operate the grease gun or valve controlling delivery of the grease. Some attempts have been made at positively locking the coupling onto the fitting prior to applying the grease pressure, but no such couplings have been known commercially. In both U.S. Pat. Nos. 1,796,827 and 1,799,279, the entire grease gun must be rotated while the tip end of the coupling is indexed by the hexagonal collar on the Zerk fitting. These couplers are unnecessarily complicated for the intended purpose.

SUMMARY OF THE INVENTION

This inveniton provides a coupler to a grease fitting whereby the coupler is positively connected to the fitting by simply applying the coupler to the fitting and then slightly rotating the coupler socket relative to both the stationary fitting and the supply tube upon which the coupler is mounted. The sound mechanical connection is completed before the pressure is applied to the grease to be directed through the coupler and fitting. As a result, the coupler need not be manually held during injection of grease under pressure into the fitting. Not only does this make possible application of grease to fittings to which access is difficult, but spillage and wastage of grease is prevented.

The coupler maintains simplicity of construction while providing effectiveness in clamping with only a minimum of manual effort and thorough sealing to limit flow of grease only into the fitting as desired.

In the coupler, a rotatable socket is threaded onto the tubular base of the coupler. A substantially stationary but rotatable rigid sleeve and washer provide a nonyielding mechanical connection or drive between the stationary tubular base and the jaws in the receiving end of the socket. In this way, the jaws are driven and held in a forward position to clamp the insert portion of the fitting within the socket.

A neoprene cup-shaped seal behind the washer rotates with and seals outwardly against the rigid socket and washer, and has an apertured boss projecting through the washer for delivering grease to the insert portion of the fitting which bears and seals against the end face of the gasket boss.

The rigid sleeve has drive legs which pierce the bottom of the cup-shaped gasket to bear directly against the washer without interfering with the principal sealing functions of the gasket.

Although the jaws are normally urged forwardly into somewhat constricted condition by a coil spring which bears forwardly against the gasket and acts through the washer against the jaws, the jaws are permitted to snap out of the way as the insert portion of the fitting is received within the socket. The coil spring is anchored against the ball check valve bearing against the annular seat in the tubular base of the coupler.

BRIEF DESCRIPTION OF DRAWINGS

FIG. 1 is a longitudinal section view through the coupler and tube supplying grease thereto, and the fitting to be inserted into the socket.

FIG. 2 is a detail elevation view, partly broken away and shown in section, of the rigid drive sleeve.

FIG. 3 is an end elevation view of the drive sleeve of FIG. 2.

FIG. 4 is an elevation view, partly broken away and shown in section, of the cup-shaped gasket.

FIG. 5 is an end elevation view of the gasket of FIG. 4.

FIG. 6 is a detail elevation view, partly broken away and shown in section, of the rigid washer.

FIG. 7 is an end elevation view of the washer of FIG. 6.

FIG. 8 is a detail section view of the coupler as indicated at 8—8 of FIG. 1.

FIG. 9 is an end elevation view of the socket end of the coupler.

FIG. 10 is a longitudinal detail section view of the coupler with the grease fitting assembled therewith.

DETAILED SPECIFICATION

One form of the invention is shown in the drawings and is described herein.

The coupler is indicated in general by the numeral 10 and is for the purpose of coupling a conduit 11 which may carry lubricating grease under substantial fluid pressure from a hand-operated grease gun or other source of grease under pressure, to a Zerk fitting 12 which receives the grease which originates at the pressure source and tube 11. The grease fitting 12 may be threadably connected to a machine adjacent a bearing which needs to receive lubricant, or the fitting 12 may be connected to another type of dispensing point for grease, such as a needlepoint, or may also be connected to a flexible hose or an angle attachment, or some other grease-conveying device. The Zerk fitting 12 is well known to persons of skill in the art and it will be recognized that the fitting 12 may have an internal check valve 13 normally spring pressed into closed condition.

It will be recognized that the conduit 11 may be rigid or flexible, but if flexible, will have a threaded fitting on its end for connection to the coupler 10.

The coupler 10 includes a tubular base 14 internally threaded at 15 for assembly with the conduit 11. The front end portion 16 of the tubular base is threaded at 17 on its exterior periphery. The end portion is grooved slightly at 17′ adjacent the annular shoulder 14.1 so as to remove a length of the threads 17.

An interior annular valve seat 18 receives the ball valve 19 thereon to seal against reverse flow of grease from the coupler 10 into conduit 11 and to minimize undesired forward flow of grease from the conduit 11 to the coupler 10, except when positive pressure is applied to the grease flowing from the conduit 11. A coil spring 20 bears rearwardly against the ball valve 19 to normally retain the ball valve against the seat 18.

The coupler 10 also includes a cylindrical socket or sleeve 21 with an internally threaded rear portion 22 threaded onto the front portion 16 of the tubular base 14. The sleeve 21 is rotatable from the position shown into engagement with the shoulder 14.1. Sleeve 21 is prevented from rotating on the threads in the other direction and toward the front end of portion 16 because the sleeve is slightly deformed or staked at 22.1 so as to cause the threads to jam if an attempt is made to screw sleeve 22 off base 14. Both the tubular base 14 and socket 21 are preferably formed of steel such as stainless steel, but equivalent materials might be used. A molded nylon thumbpiece in the form of a tapered cylinder 23 is applied over the rear portion 22 of the socket 21 to facilitate ready and easy manual turning of the socket 21 for locking and unlocking the fitting during use.

The socket 21 has a substantially cylindrical wall 24 with an in-turned annular lip 25 at its front end defining the socket opening 26 through which the insert portion 27 of the fitting 12 will be received. The inner surface 28 of the annular lip 25 is conically tapered and converges in a generally forward direction between the inner periphery of wall 24 and the inner periphery of the annular lip 25.

The coupler 10 is also provided with three clamping jaws 29 which lie along the interior periphery of wall 21 and normally bear against the inner periphery of the annular flange 25 at the front end of the socket 21. The jaws 29 have side edges 30 which are normally spaced apart, except that the front edges of the jaws 29 may bear against each other immediately adjacent the flange 25 when the socekt does not contain a fitting 12. It will be noted that the jaws 29 are curved inwardly adjacent their front ends so as to cam against the tapered surface 28 of the socket so as to be guided inwardly into clamping engagement with the insert portion of the fitting 12, when inserted.

The rear edges 31 of the jaws 29 bear rearwardly against an annular rigid washer 32 which traverses the inner periphery of the socket 21 and is slidable along the interior thereof. The washer 32 has a cylindrical wall 33 projecting forwardly at its inner periphery and serves several functions, one of which is to retain the clamping jaws 29 against the cylindrical sidewall 24 of the socket and prevent the jaws from inadvertently falling out of the coupler.

The coupler is also provided with a cup-shaped gasket or seal 34 formed of neoprene to resist deteriorating effects of petroleum lubricants. The gasket 34 has a peripheral wall 35 which lies along and bears outwardly against the inner periphery of the socket wall 24 and seals thereagainst. The gasket 34 also has a bottom wall 36 which bears forwardly against the washer 32 and also seals against the washer. An aperture or flow opening 37 through the base wall 36 of the gasket also opens longitudinally through a cylindrical boss 38 which projects forwardly from the base wall 36 of the gasket and through the inner periphery of washer 32. The front face 39 of the boss lies flush with the end edge of the cylindrical wall 33 of washer 32.

Gasket 34 also has a plurality of longitudinally extending openings 40 through the base wall 36 thereof and located adjacent the peripheral wall 35.

It will be recognized in FIG. 1, that the spring 20 also bears forwardly against the bottom wall 36 of the gasket 34 so as to urge the gasket 34 forwardly, but also allow free flow of grease through the interior passage 37.

The coupling 10 also has a cylindrical sleeve or slide 41 snugly received within the annular sidewall 35 of the gasket 34 and extending into engagement with the front end portion 16 of the tubular base 14. The sleeve 41 is preferably formed of substantially rigid nylon, but may also be formed of brass or stainless steel. The rear end 42 of the sleeve telescopes snugly into the front end portion 16 of the tubular base, and has an outwardly projecting annular flange 43 which bears endwise rearwardly against the end edge of the front portion 16 of the tubular base.

The sleeve 41 has a plurality of forwardly extending rigid legs or projections 44 which normally extend into and substantially through the bearing apertures 40 in the gasket 34.

As depicted in FIG. 1, the front ends of legs 44 are in confronting, but slightly spaced relation with the washer 32 so as to engage the washer when the washer moves slightly rearwardly in the socket 21. It will therefore be recognized that the sleeve 41 together with the washer 32 provides a substantially non-yielding slide means between the front end of the tubular base 14 and the rear edges 31 of the jaws 29 so as to absolutely prevent any further rearward movement of the jaws 29 after the washer 32 moves slightly rearwardly and bears against the ends of legs 44.

In FIG. 8, the legs 44 are depicted to be substantially rectangular in cross-sectional shape, but such legs could be shaped somewhat differently, such as round or square in cross-sectional shape.

In operation, the lubricating grease is normally confined in the interior of conduit 11 without being under any pressure as to cause it to flow. Under this condition, the ball valve 19 will restrain the grease from flowing forwardly through the coupler 10. The spring 20 which holds the ball valve 19 against the valve seat 18 also urges the gasket 34 and washer 32 forwardly as to urge the jaws 29 forwardly against the annular lip 25 of the socket 21. This forward pressure on the jaws 29 is sufficient as to cause the jaws to cam inwardly, because of their curved shape, against the annular lip 25 until their front edges touch against each other. Initially, the relationship between the washer 32 and the rigid sleeve 41 and the tubular base 14 is such as to accommodate some limited rearward movement of the jaws 29 and washer 32 in order to allow the insert portion 27 of fitting 12 to snap into the socket 21. In FIG. 1, the front ends of legs 44 of sleeve 41 are spaced slightly from the washer 32; but in the event the neoprene gasket 34 tightly grips the legs 44 of sleeve 41, the gasket 34 may hold the ends of the legs 44 flush against the washer 32 and in this event there will be some small space between the annular flange 43 and the end edge of the front portion 16 of the tubular base 14.

When the coupler 10 is to be applied to the fitting 12, the socket 21 is manually pushed onto the insert portion 27 as to receive the insert portion 27 therein. The front conical portion of the fitting 12 will guide the front tip ends of jaws 29 slightly rearwardly and slightly outwardly as to permit the entire insert portion 27 of the fitting 12 to be received within the socket 21. As this insertion of the fitting 12 is occurring, the jaws 29 move the washer 32 slightly rearwardly in the socket 21 against the pressure of spring 20, and as soon as the insert portion 27 of fitting 12 is in its proper position in socket 21 with the front face of the insert portion 27 lying flush against the end face 39 of gasket 34, the spring 20 will again urge the gasket 34 and washer 32 forwardly to a small extent as to again cause the jaws 29 to move forwardly and cam inwardly to grasp the insert portion of the fitting 12 with a rather light pressure. In this condition, the coupler 10 can be easily pulled off the fitting 12 again because there is very little restraint against the opening of jaws 29.

After the coupler 10 is seated upon the insert portion of fitting 12, with the front face of the insert portion 27 lying flush against the front face 39 of gasket 34, the person handling the coupler 10 will simply rotate the socket 21 through approximately one-fourth of a turn so as to move the socket 12 rearwardly along the tubular base 14, and as illustrated in FIG. 1, to move the socket 21 slightly to the left as indicated by the dotted lines D.

As the socket 21 is rotated slightly in this manner, the socket 21 urges the jaws 29 rearwardly, or to the left as illustrated in FIG. 1, so as to take up the slack between the washer 32 and the ends of the legs 44 so that a non-yielding mechanical connection is created between the rear edges 31 of the jaws and the front portion 16 of the tubular base 14. Further rearward movement of jaws 29 is thereby absolutely prohibited. The slight rearward movement of the socket 21 causes inward camming of the jaws 29 into grasping relation with the insert portion 27 of fitting 12. This is substantially the condition illustrated in FIG. 10.

Usually, in use, the coupling 10 will be rather tight on the fitting 12 as to prevent any cocking or tipping motion between the coupler 10 and fitting 12.

When the coupler 10 has been adjusted by turning the socket 21 as to cause the jaws 29 to grasp the fitting, the pressure may be applied to the grease so as to cause flow of grease forwardly from conduit 11 and through the tubular base 14. The grease pressure will raise the ball valve 19 off the seat and cause flow of grease around the ball valve and through the central area of sleeve 41 and through the opening 37 of gasket 34 and into the fitting 12.

When sufficient grease has been supplied into the fitting 12, the grip portion 23 of socket 21 will be turned in the opposite direction as to move the socket 21 forwardly along the tubular base 14, or to the right as depicted in FIG. 1. As the socket is moved in this manner, the jaws 29 are loosened, and the coupler 10 may be simply pulled off the fitting 12. As the coupler 10 is pulled off the fitting 12, the jaws 29 will momentarily move outwardly against the pressure of spring 20, and then will again return slightly inwardly into the position illustrated in FIG. 1.

It will be seen that I have provided a new and improved coupler facilitating locking of a grease conduit to a Zerk fitting simply by slightly rotating the socket into which the fitting is inserted. The sleeve 41 together with the washer 32 define a non-yielding mechanical connection between the rear ends of the jaws 29 and the front end of the tubular base 14, and the rearward movement of the socket along the jaws causes the jaws to cam inwardly into grasping relation on the fitting. The cup-shaped gasket is provided with openings in its base wall through which legs on the rigid sleeve extend so that the sleeve will bear directly against the washer 32. The gasket seals against the inner periphery of the socket wall 24 and the gasket also seals against the washer 32 and under pressure conditions against the legs 44 of the sleeve as to assure that all of the grease that is flowing will move through the opening 37 and into the fitting 12.

What is claimed is:

1. A coupler providing a flow connection between a conduit through which grease may be supplied under pressure and a grease fitting, comprising
    a tubular base adapted for connection to such conduit,
    a tubular rotatable socket having a rear end embracing the base and threaded thereon and also having a front end with an annular in-turned lip defining the access opening through which the fitting is received,
    an annular washer within the socket and traversing the interior thereof,
    a plurality of clamping jaws within the socket and engaging the annular lip to grasp the fitting as the jaws are moved endwise in the socket, the jaws having rear ends bearing against the washer to be moved thereby,
    a cup-shaped neoprene gasket having a base wall bearing against the annular washer and also having an apertured boss projecting forwardly through the washer to seal against and deliver grease to the fitting in the socket, the gasket also having a peripheral sidewall bearing outwardly and sealing against the socket periphery, the base wall of the gasket also having a plurality of bearing apertures endwise therethrough and adjacent the peripheral sidewall, and
    a rigid sleeve within the cup-shaped gasket and having a rear end endwise confronting the tubular base to bear thereagainst, and the sleeve having a plurality of rigid legs extending endwise and projecting through the bearing apertures in the base wall of the gasket and bearing against the washer and driving the jaws endwise for locking onto the fitting as the socket is rotated.

2. The coupler according to claim 1 and the rear end of the sleeve including an outwardly projecting annular flange bearing endwise against the end of the tubular base.

3. The coupler according to claim 1 and the rear end of the sleeve including an end portion telescoped within the end of the tubular base.

4. The coupler according to claim 1 and the tubular base also having an annular valve seat facing forwardly toward the gasket, a ball valve normally engaging the seat and spaced from the rear end of the sleeve.

5. The coupler according to claim 4 and a spring between the ball valve and the bottom wall of the gasket and urging the ball valve against the seat.

6. The coupler according to claim 1 and the sleeve being formed of substantially rigid nylon.

7. The coupler according to claim 1 and the sleeve being formed of brass.

8. A coupler providing a flow connection between a conduit through which grease may be supplied under pressure and a grease fitting, comprising
    a tubular base adapted for connection to such a conduit, a tubular rotatable socket having a rear end embracing one end of the base and threaded thereon and also having a front end with an annular in-turned lip defining the access openings through which the fitting is received a plurality of clamping jaws within the socket and engaging the annular lip to grasp the fitting, the jaws lying along the inner periphery of the socket, gasket means in the socket and sealing against the inner periphery thereof between the jaws and the end of the tubular base, the gasket means also having a gasket base with a plurality of apertures therein, the base at the periphery of one aperture sealing against the fitting grasped by the jaws, and a non-yielding slide means within the rotatable socket and slidable longitudinally along the inner periphery thereof, the slide means being disposed between and bearing against the end of the tubular base and the jaws and through other of the said apertures of the base to move the jaws forwardly as the socket is rotated on the tubular base.

9. The coupler according to claim 8 wherein said slide means includes projecting portions extending endwise through the other apertures of the base of the gasket means.

10. A coupler providing flow connection between a conduit through which grease may be supplied under pressure and a grease fitting, comprising a tubular base adapted for connection to such a conduit, the tubular base having a forward end portion threaded at its exterior and provided with a forwardly facing annular valve seat at the interior thereof, a tubular rotatable socket having a generally cylindrical wall with a rear end having internal threads embracing and threaded upon the forward end portion of the tubular base, the cylindrical wall of the rotatable socket having a front end with an annular in-turned lip defining the access opening through which the fitting is received, an annular washer within the socket and traversing the interior thereof, the washer having a cylindrical wall at its interior periphery and projecting forwardly in the socket, a plurality of clamping jaws within the socket lying along the cylindrical wall between the washer and the annular lip and engaging the annular lip to grasp the fitting, a cup-shaped neoprene gasket having a base wall bearing against the annular washer and also having an apertured boss projecting forwardly through the cylindrical wall of the washer to seal against and deliver grease to the fitting in the socket, the gasket also having a peripheral sidewall bearing outwardly against the inner periphery of the socket wall and for sliding therealong, the base wall of the gasket also having a plurality of bearing apertures endwise therethrough and adjacent the peripheral sidewall, and a rigid cylindrical sleeve received within the peripheral sidewall of the cup-shaped gasket, the rear end of the sleeve having a portion telescopically received within the forward end portion of the tubular base and also having an outwardly projecting annular flange bearing endwise rearwardly against the forward end portion of the tubular base, and the rigid sleeve having a plurality of rigid legs extending through the bearing apertures in the base wall of the gasket and bearing against the washer and driving the jaws endwise for locking onto the fitting as the socket is moved endwise rearwardly along the tubular base and relative to the sleeve, gasket, washer and jaws.

* * * * *